Patented Jan. 26, 1954

2,667,439

UNITED STATES PATENT OFFICE 2,667,439

THEOPHYLLINE COMPOSITION CONTAINING ANTINAUSEANT FACTORS

Bernard Adolph Marty, Decatur, Ill., assignor to Irwin, Neisler and Company, Decatur, Ill., a corporation of Illinois No Drawing. Application July 23, 1952,
Serial No. 300,500

6 Claims. (Cl. 167—55)

The present invention relates to a therapeutic composition containing theophylline, or theophylline derivatives, and is more particularly concerned with an aminophylline, aluminum hydroxide and benzocaine composition possessing valuable antispasmodic, vasodilator and antiasthmatic properties and exhibiting very desirable antinauseant qualities.

Heretofore, the administration of aminophylline (a salt of theophylline with ethylene diamine) and other members of the xanthine family of weakly basic alkaloids has been accompanied by gastric discomfort, nausea and vomiting. Frequently, a therapeutically active dosage cannot be administered because of these emetic factors. Combinations of aminophylline and other theophylline (1,3-dimethylxanthine) compositions, and ephedrine have been used orally for relief or prevention of mild but chronic asthmatic attacks. Various barbiturates, including phenobarbital, have been incorporated occasionally in these compositions to impart sedative action which tends to offset the stimulatory action of the aminophylline-ephedrine combination. However, the undesirable irritating effects of the aminophylline, or other theophylline compound, dosage have not been obviated in such combinations.

Therefore, it is an object of the present invention to provide a therapeutically active combination comprising theophylline, or derivatives thereof, aluminum hydroxide and ethyl para-aminobenzoate (benzocaine).

It is a further object of the present invention to provide an aminophylline combination containing antinausea factors so that a therapeutically active dosage of aminophylline may be administered without causing concomitant irritating side-effects.

Another object of the present invention is to provide a therapeutically active combination containing aminophylline which is characterized by its antispasmodic, vasodilator and anti-asthmatic properties.

Other objects of the present invention will be apparent to those skilled in the art to which this invention pertains.

The present invention is a therapeutic composition comprising a compound selected from the group consisting of theophylline and theophylline derivatives, aluminum hydroxide and ethyl para-aminobenzoate (benzocaine). The composition of the present invention thus has special utility in the treatment of bronchial asthma, pulmonary emphysema, angina pectoris and other disorders of the coronary circulation, and as a diuretic in clinical states characterized by normal retention of fluids, including congestive heart failure and nephrotic states. Greater clinical tolerance than previously obtained in treatment of the above states is achieved with the novel combination of the present invention.

A combination of aluminum hydroxide, preferably in a dried gel form, and ethyl para-aminobenzoate benzocaine) has been discovered to be efficacious in imparting antinauseant qualities to the therapeutic composition containing a theophylline-type compound.

In preparing the novel aminophylline combination, varying amounts of aminophylline or other theophylline containing preparation, aluminum hydroxide, either as white, monoclinic crystals or in the dry gel form, and benzocaine may be employed. Preferably, the composition comprises from between about three and five grains or more of aminophylline, from between about two and one-half to about five grains or more of aluminum hydroxide and from about one-fourth to two and one-half grains of ethyl aminobenzoate. These amounts can be satisfactorily utilized in producing a therapeutically active dosage. The various components can be admixed in any order and it is generally desirable to dry blend a mixture until a homogeneous combination is achieved. Preferably, the benzocaine is added after the other ingredients are blended. In addition, various other components not contributing medicinally to the combination may be incorporated. For example, an aqueous solution containing gelatin and gum acacia may be added to facilitate the granulation of the theophylline with the dried aluminum hydroxide gel and phenobarbital or other barbiturate, which latter compounds may be included, if desired. After granulation is complete, the ethyl para-aminobenzoate may be added to the composition together with a substantial amount of starch in the form of a starch solution. Chalk and brown iron oxide can be included as coloring agents, if desired. In preparing a completed composition that is suitable for use in the tablet process, stearic acid and talcum may be employed as lubricants.

After mixing is complete, the final composition may be dried at a temperature between about 60 and 140 degrees Fahrenheit, temperatures greater than 140 degrees Fahrenheit being avoided in order to obviate any deleterious heat effects.

The pharmacological and therapeutic properties of amino-phylline are due primarily to its theophylline content, which produces relaxation of the bronchial musculature and enhances pulmonary functioning. The aluminum hydroxide serves as an antacid, which effectively neutralizes the hydrochloric acid of the stomach, while its physical adsorption and gel-like properties give added mechanical protection to the gastric mucosa from possible aminophylline irritation. The benzocaine acts to penetrate the mucous membrane and blocks impulses to sensory nerve endings. The anesthetization of these nerve endings of the gastric mucosa tends to obviate the nausea, vomiting and stimulatory effects attributable to the aminophylline. Thus, the utilization of both aluminum hydroxide and benzocaine provides antinauseant factors that permit the successful administration of a therapeutically active dose of aminophylline.

The following examples are illustrative of the novel composition of the present invention, but are not to be construed as limiting.

*Example 1*

An admixture of four grains of aminophylline, comprising about seventy percent theophylline and about thirty percent ethylene diamine, three-eighths grain of phenobarbital, one-half grain of sodium pentobarbital, and two and one-half grains of aluminum hydroxide was blended in a pot mill until a completely homogeneous mixture was obtained. The resulting mixture was transferred to a Day mixer, and granulation initiated. During such granulation, a sufficient quantity of a gum solution composed of ten parts by weight of gelatin, three parts by weight of gum acacia, and 126 parts by weight of water was added in small portions to insure satisfactory granulation. After granulation was complete, one-fourth grain of ethyl para-aminobenzoate and a small amount of starch were admixed with the granulated composition and the resulting composition dried at a temperature of less than 140 degrees Fahrenheit. The composition was found to possess valuable therapeutic properties.

*Example 2*

Following the procedure of Example 1, three grains of aminophylline, one-fourth grain of sodium pentobarbital, three grains of ephedrine hydrochloride and two and one-half grains of aluminum hydroxide were admixed in a pot mill until a homogeneous mixture was obtained. The resulting mixture was then granulated in a Day mixer employing the necessary amount of the gelatin-gum acacia-aqueous mixture referred to in Example 1 to accomplish satisfactory granulation. A quarter (¼) grain of benzocaine and a small quantity each of chalk, starch and brown iron oxide were added and mixing continued until a completely homogeneous composition was obtained. The resulting therapeutic composition exhibited excellent anti-asthmatic properties.

*Example 3*

0.18 gram of theophylline was admixed with 0.33 gram of dried aluminum hydroxide gel and the resulting admixture blended in an open container. 0.016 gram of ethyl para-aminobenzoate (benzocaine) was then added to the admixture and blending continued until a homogeneous combination was obtained. Such combination exhibited valuable anti-asthmatic, vasodilator and antispasmodic properties.

Following the procedures of Examples 1, 2 and 3, other therapeutic compositions are prepared utilizing other theophylline derivatives such as theophylline sodium glycinate, theophylline sodium acetate, and others.

It is to be understood that the invention is not to be limited to the exact details of operation or compounds shown and described, as obvious modifications and equivalents will be apparent to one skilled in the art, and the invention therefore is to be limited by the scope of the appended claims.

I claim:

1. A therapeutic composition comprising: a compound selected from the group consisting of theophylline and theophylline salts; aluminum hydroxide; and ethyl para-aminobenzoate.

2. A therapeutic composition comprising aminophylline, aluminum hydroxide and ethyl para-aminobenzoate.

3. A therapeutic composition comprising theophylline, aluminum hydroxide and ethyl para-aminobenzoate.

4. A therapeutic composition characterized by its antiasthmatic and antinauseant properties comprising: between about three and about five parts by weight of aminophylline, between about two and one-half and about five parts by weight of aluminum hydroxide and between about one-fourth and about two and one-half parts by weight of ethyl para-aminobenzoate.

5. A therapeutic composition comprising a theophylline salt, aluminum hydroxide and ethyl para-aminobenzoate.

6. A therapeutic composition comprising: five grains of aminophylline, two and one-half grains of aluminum hydroxide, and one-fourth grain of ethyl para-aminobenzoate.

BERNARD ADOLPH MARTY.

References Cited in the file of this patent

UNITED STATES PATENTS

| Number | Name | Date |
| --- | --- | --- |
| 2,433,765 | Krantz | Dec. 30, 1947 |
| 2,601,285 | Henderson | June 24, 1952 |

OTHER REFERENCES

American Druggist, vol. 125, May 12, 1952, page 35.

U. S. Dispensatory, 24th ed. (1947), pages 54 to 56, 60, 61, 447, 448, 1205 and 1206.

Modern Drug Encyclopedia, 4th ed. (January 1949), page 34.